3,134,824
ETHYLENE POLYMERIZATION WITH SUPPORTED NICKEL BISCYCLOPENTADIENYL CATALYST
Darrell W. Walker and Edward L. Czenkusch, Bartlesville, Okla., assignors to Phillips Petroleum Company, a corporation of Delaware
No Drawing. Filed June 15, 1961, Ser. No. 117,280
9 Claims. (Cl. 260—683.15)

This invention relates to a catalyst composition comprising biscyclopentadienyl nickel deposited on certain porous supports, to a method of preparing the catalysts, and to the polymerization of ethylene with the catalyst.

Biscyclopentadienyl nickel is one of a group of recently synthesized organometallic compounds which because of their peculiar type of metal to carbon bonding are commonly called "sandwich" compounds. This invention is concerned with a method of preparing a catalyst for use in polymerization of ethylene, to the polymerization process, and to a catalyst support on which the nickel compound is deposited.

Accordingly, it is an object of the invention to provide a novel catalyst which contains biscyclopentadienyl nickel. Another object is to provide a method of preparing an active supported catalyst containing biscyclopentadienyl nickel which is active for the polymerization of ethylene. A further object is to provide a novel process for polymerizing ethylene to liquid polymers. Other objects of the invention will become apparent to one skilled in the art upon consideration of the accompanying disclosure.

We have found that biscyclopentadienyl nickel deposited on a support selected from the group consisting of silica, alumina, titania, zirconia, thoria, boria, and mixtures thereof, is an active catalyst for the polymerization of ethylene to liquid polymers which contain dimers, hexamers, and heavier molecules. These low molecular weight polymers are useful as internal combustion engine fuels or as fuel additives.

The biscyclopentadienyl nickel which is used in the invention may be prepared by any convenient method such as that of Fischer and Jira described in Z. Nuturforsch 8b 217–219 (1953) [C.A. 48 1192 i (1954)]. The composite catalyst is formed either by dry mixing the nickel compound with the selected support, or preferably, by impregnating the support with a solution of the nickel compound. When the impregnation technique is used, the nickel compound is dissolved in 5–50, preferably 15–25 times its weight of an inert solvent such as benzene, toluene, xylene, cyclohexane, pentane, isooctane, etc. The solution is then contacted with the preactivated solid support for 5 minutes to 20 hours at 50–150° F. Following such contact the volatile solvent is removed by evaporation at reduced pressure and at temperatures of 50–150° F. The quantity of solid support and solution used is such that the finished composite catalyst contains 0.1 to 20 weight percent, preferably 2 to 10 weight percent of the organometal compound. An inert gas blanket such as nitrogen and a water free system is used to protect the composite catalyst during impregnation and prior to its use in the polymerization process.

The solid support, prior to impregnation, is preactivated so as to remove free water by heating at temperatures between 700–1500° F. for a period of 0.5 to 24 hours in air. It may be additionally heated in the presence of other gases such as nitrogen, hydrogen, or carbon monoxide. After the preactivation the support is cooled and stored in an inert and dry atmosphere.

According to the process of this invention, the olefin charge and catalyst are contacted at a temperature of 150–450° F. and a pressure of 0–2000 p.s.i.g. The process may be carried out in the presence or absence of a diluent. While any desired polymerization technique, such as fixed bed catalyst or stirred reactor, can be employed, it is preferred to employ a diluent. Whatever technique is used, the reaction can be carried out batchwise or continuously. The reaction time will range from 0.1 minute to 10 hours, preferably 0.5 to 5 hours. In a stirred reactor type run, the catalyst concentration will generally range from 2–40 weight percent of the reaction mixture. In a fixed catalyst bed reaction, the space velocity will generally range from 10 to 10,000.

At the end of the reaction period, the polymers may be recovered by any suitable method. The liquid polymers, for example, may be recovered by such methods as evaporation, extraction, and the like.

In order to illustrate the invention, the following examples are presented. These examples are illustrative and are not to be construed as unnecessarily limiting the invention.

*Example 1*

Commercial 87:13 silica-alumina having an average particle size of about 70 microns was activated by heating 20 hrs. at 1000° F. in air, 0.5 hr. in nitrogen, and 2 hrs. in hydrogen. A 14.13 g. quantity of the preactivated solid was dispersed in 30 cc. of a clear green toluene solution containing 0.9431 g. biscyclopentadienyl nickel at 70° F. This operation was carried out in a water-free system under a blanket of nitrogen. The toluene solvent was then removed from the slurry by vacuum distillation at no higher than room temperature. A brown-red free flowing powder containing approximately 2% nickel (as metal) was obtained.

A 2.54 g. quantity of the above prepared catalyst was charged into a 1.4 liter, stirred, stainless steel reactor, previously warmed and purged with nitrogen, together with 227 g. dry cyclohexane. The reactor was heated to 280° F. and the reaction allowed to proceed for 1 hr. at 410 p.s.i.g. maintained by a flow of ethylene.

At the completion of the reaction the contents of the reactor were removed and subjected to a fractional distillation to isolate the polymerized material.

The yield was 124.1 g. of liquid polymer. When examined by vapor phase chromatography the following analysis was obtained:

| | Percent |
|---|---|
| $C_4$ olefins | 67.0 |
| $C_6$ olefins | 13.1 |
| $C_8$ olefins | 8.0 |
| $C_{10}$ olefins | 7.4 |
| $C_{12}$ olefins | 3.0 |
| $C_{14}$ olefins | 1.5 |

Moreover, the $C_4$ olefin fraction was isolated and analyzed as follows:

| | Percent |
|---|---|
| Butene-1 | 24.6 |
| Trans-butene-2 | 46.0 |
| Cis-butene-2 | 28.4 |

Similarly the $C_6$ olefin fraction was isolated and analyzed as follows:

| | Percent |
|---|---|
| Hexene-1 and 2-methylpentene-1 | 6.7 |
| Trans-hexene-2 and cis and trans-hexene-3 | 33.2 |
| 2-methylpentene-2 | 33.2 |
| Cis-hexene-2 | 5.5 |
| Trans-3-methylpentene-2 | 12.2 |
| Cis-3-methylpentene-2 | 9.2 |

The overall polymerization rate was 49 lbs./lb. catalyst/hr.

Example II

A 2.69 g. portion of the composite catalyst prepared in Example I was charged into a similar reactor and was used to polymerize ethylene under conditions identical to those of Example I except that the maximum pressure was 425 p.s.i.g. and the temperature was increased to 320° F. The yield was 103.8 g. of which 63.5 g. were $C_4$ olefins and 40.3 g. were heavier olefins. The $C_4$ olefin fraction was found to contain the following isomers.

| | Percent |
|---|---|
| Butene-1 | 21.3 |
| Trans-butene-2 | 50.1 |
| Cis-butene-2 | 28.6 |

The overall rate of the polymerization was 38.6 lbs. polymer/lb. catalyst/hr.

Certain modifications of the invention will become apparent to those skilled in the art and the illustrative details disclosed are not to be construed as imposing unnecessary limitations on the invention.

We claim:

1. The process of polymerizing ethylene to liquid polymer comprising contacting ethylene under polymerizing conditions with a catalyst formed by depositing biscyclopentadienyl nickel on a support selected from the group consisting of silica, alumina, titania, zirconia, thoria, boria, and mixtures thereof, so as to produce liquid polymer.

2. The process of claim 1 wherein the concentration of biscyclopentadienyl nickel in the catalyst is in the range of 0.1 to 20 weight percent.

3. The process of claim 1 wherein said support consists essentially of silica-alumina.

4. The process of claim 3 wherein the concentration of biscyclopentadienyl nickel in the catalyst is in the range of 0.1 to 20 weight percent.

5. The process of claim 1 wherein said ethylene is dissolved in an organic solvent inert in the reaction mixture.

6. The process of claim 5 wherein said polymerizing conditions include a temperature in the range of 150 to 450° F. and a pressure within the range 0 to 2000 p.s.i.g.

7. The process of polymerizing ethylene to liquid polymer comprising contacting ethylene dissolved in an organic diluent inert in the reaction medium with a catalyst formed by depositing biscyclopentadienyl nickel on a silica-alumina support in a concentration on said support in the range of 2 to 20 weight percent, at a temperature in the range of 150 to 450° F., and at a pressure in the range of 0 to 2000 p.s.i.g., so as to produce liquid polymer.

8. The process of claim 7 wherein said contacting is effected in a stirred reactor at a contact time in the range of 0.5 to 5 hours with a catalyst concentration in the range of 2 to 40 weight percent of the reaction mixture.

9. The process of claim 7 wherein said contacting is effected in a fixed bed reactor at a space velocity in the range of 10 to 10,000.

References Cited in the file of this patent

UNITED STATES PATENTS

| | | |
|---|---|---|
| 2,483,782 | Pierce | Oct. 4, 1949 |
| 2,562,888 | Bond | Aug. 7, 1951 |
| 2,710,854 | Seelig | June 14, 1955 |
| 2,909,512 | Bruce | Oct. 20, 1959 |
| 2,969,408 | Nowlin et al. | Jan. 24, 1961 |
| 2,980,744 | Voltz | Apr. 18, 1961 |
| 2,999,075 | Pruett | Sept. 5, 1961 |